United States Patent [19]

Tünker

[11] Patent Number: 4,913,847
[45] Date of Patent: Apr. 3, 1990

[54] FIRE-RETARDANT MASS AND METHOD OF MAKING SAME

[75] Inventor: Gerhard Tünker, Duisburg-Rheinhausen, Fed. Rep. of Germany

[73] Assignee: Flachglas Aktiengesellschaft, Furth, Fed. Rep. of Germany

[21] Appl. No.: 239,214

[22] Filed: Aug. 31, 1988

[30] Foreign Application Priority Data

Sep. 5, 1987 [DE] Fed. Rep. of Germany ....... 3729867

[51] Int. Cl.$^4$ .............. C09K 21/00; B32B 17/00; B32B 9/00; B32B 17/06
[52] U.S. Cl. .................. 252/606; 252/601; 156/99; 156/102; 52/789; 427/161; 428/427; 428/320.2; 428/701; 428/702
[58] Field of Search ............ 428/428, 427, 413, 920, 428/921, 411.1, 323, 320.2, 699, 701, 702; 252/601, 609, 606; 427/161; 52/789; 156/99, 102

[56] References Cited

U.S. PATENT DOCUMENTS

| | | | |
|---|---|---|---|
| 3,367,863 | 2/1968 | Cooper et al. | 252/2 |
| 4,190,698 | 2/1980 | De Boel et al. | 428/334 |
| 4,268,581 | 5/1981 | De Boel | 428/428 |
| 4,292,188 | 9/1981 | Barone et al. | 252/62 |
| 4,312,673 | 1/1982 | Neely, Jr. | 106/74 |
| 4,334,941 | 6/1982 | Neely, Jr. | 156/107 |
| 4,433,016 | 2/1984 | Neely, Jr. et al. | 428/34 |
| 4,634,634 | 1/1987 | Kondo et al. | 428/432 |
| 4,676,998 | 6/1987 | Nolte et al. | 427/161 |

FOREIGN PATENT DOCUMENTS

| | | |
|---|---|---|
| 2414576 | 3/1975 | Fed. Rep. of Germany . |
| 2023452 | 1/1980 | United Kingdom ............... 252/606 |

Primary Examiner—Howard J. Locker
Attorney, Agent, or Firm—Herbert Dubno

[57] ABSTRACT

A process for making a fire-retardant composition in which monoaluminumphosphate is reacted with boric acid in a weight ratio 10:1 to 25:1, and to which preferably aluminum oxide in the form of aluminumhydroxide gel is added. The composition is applied between glass panes to form a fire-retardant barrier.

10 Claims, 1 Drawing Sheet

FIRE-RETARDANT MASS
$Al(H_2PO_4)_3 / H_3BO_3 = 10:1 - 25:1$
$+ 1 - 2\% Al_2(OH)_3$

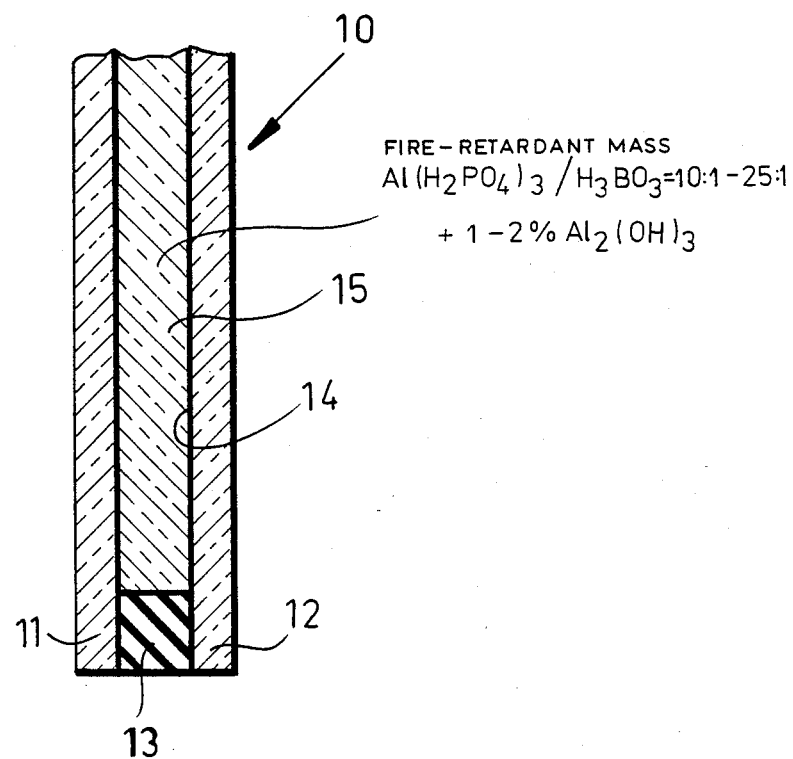

FIRE-RETARDANT MASS AND METHOD OF MAKING SAME

FIELD OF THE INVENTION

My present invention relates to a fire-retardant mass and a method of making same. More particularly, the invention relates to fire-retarding glazing and, specifically to a fire-retardant glazing which comprises a fire-retardant mass between a pair of glass panes and to a method of making that glazing or the fire-retardant mass contained therein.

BACKGROUND OF THE INVENTION

It is known from German Patent 24 14 576 (see also U.S. Pat. No. 3,997,700) to provide a fire-retardant mass which can be incorporated between two glass panes in an intervening space therebetween, by reacting a water-soluble aluminum salt and an inorganic acid to produce a hydrated-metal salt which forms the fire-retardant mass upon drying.

In practice, therefore, when the fire-retardant mass is introduced between glass panes and dried, e.g. in hot air, so that the water required for the foaming of the product, which s present as water of hydration, is driven or destroyed, the product, when subjected to fire, can foam in place to form a barrier to further penetration of heat or fire, absorb substantial amounts of heat and otherwise act as a fire-retardant mass.

In the aforementioned patent the aluminum salt is hydrated aluminum chloride and the inorganic acid is phosphoric acid so that the fire-retardant mass consists predominantly of hydrated aluminum phosphate.

A problem with this product is that, even in its finished form, it can contain quantities of chlorine from which chlorine gas can be liberated even upon drying. Chlorine gas has an environmental hazard both at the workplace and at the site at which the glazing is installed.

In addition, the resistance of the glazing to aging and its optical clarity under exposure to sunlight and heat leaves much to be desired. Furthermore, the fire resistance, foaming characteristics and other properties of the product appear to invite improvement.

OBJECTS OF THE INVENTION

It is the principal object of the present invention, therefore, to provide an improved fire-retardant mass which is free from the drawbacks enumerated above.

Another object of the invention is to provide a fire-retardant mass, especially for glazing as described, which has improved characteristics such as aging resistance under the effect of sun's rays and heat, refractoriness and foaming.

Still another object of the invention is to provide an improved method of making a fire-retardant mass or composition with improved properties.

It is also an object of this invention to provide an improved fire-retardant glazing and method of making same.

SUMMARY OF THE INVENTION

These objects are attained, in accordance with the invention, by the use of monoaluminumhydrophosphate, $Al(H_2PO_4)$ as the aluminum salt and boric acid, $H_3BO_3$, as the inorganic acid, the resulting reaction product being combined with a quantity of water so that the reaction product will have a consistency or viscosity ranging from flowable to viscous or extrudable.

Specifically the method of making the fire-retardant mass adapted to be received between glass panes can comprise the steps of:

(a) reacting in the presence of water monoaluminum-hydro-phosphate and boric acid in a weight ratio $Al(H_2PO_4)_3/H_3BO_3$ of 10:1 to 25:1 to produce a reaction product; and (b) adjusting the water content of said reaction product to yield a fire-retardant mass having a viscosity within a range from flowable liquid through viscous to extrudable.

It has been found to be advantageous to incorporate in the aforementioned fire-retardant mass a small amount of aluminum oxide in the form of the aluminum hydroxide gel which is thus incorporated into the water and improves the bond of the fire-retardant mass during and after foaming to the panes or pane of glass with which the mass is associated. The mass may be introduced in the intervening space between two such panes or in spaces between a greater number of panes in the glazing. An optimum result is obtained when one operates, in accordance with the invention, in a reaction system which comprises 90 to 95% by weight monoaluminumhydrophosphate, 4 to 8% by weight boric acid and 1 to 2% aluminum hydroxide gel.

Utilizing the principles of the invention, fire-retardant masses or compositions and fire-proof glazings can be made for various purposes. It has been found to be advantageous, however, to carry out the process and adjusting the preparations of the starting components so that the fire-retardant mass will have volume increase by foaming in the case of fire by a factor of six, preferably by a factor of more than eight.

In other words, there should be a minimum of a sixfold increase in volume and preferably a minimum of an eightfold increase in volume.

It is also possible to select the starting components so that the fire-retardant mass has prior to exposure to fire, an optical clarity, i.e. forms an optically clear layer. Preferably the latter is transparent although it can also be merely translucent.

The advantages of the invention include the fact that the fire-retardant mass has a high resistance to aging under exposure to sunlight and heat and has especially effective fire resistance and foaming properties. These advantages are gained while the mass provides an optically clear filling between the glass panes.

The fire-retardant mass can be applied in layers to the substrate which can be a glass pane. However it is also possible to extrude the fire-retardant mass as a flat band by means of an extruder having a broad-slit extrusion nozzle.

BRIEF DESCRIPTION OF THE DRAWING

The above and other objects, features and advantages of the present invention will become more readily apparent from the following description, reference being made to the accompanying drawing, the sole FIGURE of which is a cross sectional view through a glazing according to the invention.

SPECIFIC DESCRIPTION

In the drawing, I have shown glazing 10 which comprises a pair of glass panes 11 and 12 which are sealed together along their peripheries by a sealing and spacing strip 13 and which define between them an intervening space 14. According to the invention, the latter is filled with a translucent fire-retardant mass 15 formed by reacting monoaluminumphosphate, boric acid and aluminum hydroxide gel and adjusting the water content of the reaction product to allow the latter to be coated onto one of the glass panes and dried in hot air. The other glass pane is applied and sealed to form the unit.

SPECIFIC EXAMPLE

To permit the improved properties of the fire-retardant composition of the invention to be determined, a variety of tests were carried out as described below.

A 50% aqueous technical-grade solution of monoaluminum-phosphate (MAP) was used. Additives were dissolved in the solution with stirring utilizing a conventional mixer and slight heating. The finished clear solution was poured onto a flat glass pane of a thickness of 2.8 mm in an amount of 2 kg of the solution/m$^2$.

Drying was carried out in a drying chamber with a definite gas atmosphere at 90° C. until the fire-retardant layer had a residual water content of 20%. The thickness of the coating can be varied as desired but in the tests was about 0.5 mm. The dried coating was covered by a clear float glass pane with a thickness of 2.8 mm and bonding of the composite was effected at 80° C.

The following tests were conducted on the various glazing units made:

(a) Storage for 72 hours at 80° C. to test aging resistance. Aging resistance was observed by the failure of the product to cloud up while clouding was considered to show a lack of aging resistance.

(b) Heating the glazing unit in a muffle furnace at 600° C., measuring the layer thickness of the foam formed between the panes. An effective foaming means that the layer thickness exceeded eight times the starting thickness of 0.5 mm.

(c) Stand time in a fire test using a laboratory fire furnace in accordance with German Industrial Standard DIN 4102 - part 5 - section 7, with the characteristic temperature curve ETK. There was a visual observation of the glazing during the foaming. Upon rupture of the glass panes, pieces of broken glass should not be released from the foamed layer for an effective test.

The results of these tests are given in the following table.

From the table it can be seen that pure MAP is unsatisfactory in an aging test (composition 1 of the Table), clouding up. The foaming result is also poor, showing a twofold volume increase upon exposure to fire.

With 2% H$_3$BO$_3$, the foam formation is improved.

However, in composition No. 3 with 6.5% H$_3$BO$_3$, the cloudiness is eliminated, foaming is excellent and the ability to withstand fire is considerable. Bonding, however, of the ruptured glass to the foam is poor.

The reduction in cloudiness and the increase in foam volume are both surprising.

At 10% boric acid content (composition 4), a cloudiness returns, although the tenfold volume increase upon exposure to fire is maintained.

If composition 3 is modified by the addition of 1.5% aluminum oxide in the form of aluminumhydroxide gel, i.e. a compound soluble in the reaction composition, the composition 7 is obtained with increased ability to withstand fire and cut bonding of glass to the foam.

The tests given otherwise are deemed to speak for themselves.

TABLE:
COMPARISON OF PROPERTIES OF VARIOUS FIRE-RETARDANT COMPOSITION

| Composition | Ageing | Foam Thickness | Resistance to Fire | Bonding after Foaming |
|---|---|---|---|---|
| (1) MAP w/o additive | cloudy | 1 | n.d. | n.d. |
| (2) MAP/2% H$_3$BO$_3$ | cloudy | 2 | n.d. | n.d. |
| (3) MAP/6.5% H$_3$BO$_3$ | clear | 5 | 45 | poor |
| (4) MAP/10% H$_3$BO$_3$ | cloudy | 5 | n.d. | n.d. |
| (5) MAP/1% Al(OH)$_3$ | cloudy | 1 | n.d. | n.d. |
| (6) MAP/2% Al(OH)$_3$ | cloudy | 2 | n.d. | n.d. |
| (7) MAP/6.5% H$_3$BO$_3$/ 1.5% Al$_2$(OH)$_3$ | clear | 5 | 60 | good |
| (8) MAP/6.5% H$_3$BO$_3$/ 3.5% Al$_2$(OH)$_3$ | clear | 2 | 30 | good | w/o = without
n.d. = not determined

I claim:

1. A method of making a fire-retardant mass adapted to be received between glass panes, comprising the steps of:

(a) reacting in the presence of water an amount from 90 to 95% by weight of monoaluminumhydrophosphate, from 4 to 8% by weight of boric acid, and from 1 to 2% by weight of aluminum hydroxide gel to produce a reaction product; and (b) adjusting the water content of said reaction product to yield a fire-retardant mass having a viscosity within a range from flowable liquid through viscous to extrudable.

2. The method defined in claim 1 wherein step (a) the proportions of the monoaluminumhydrophosphate and the boric acid are so selected that, upon exposure to fire and in a fire-retardant reaction, said fire-retardant mass expands in volume by a factor of at least 6.

3. The method defined in claim 2 wherein said factor is in excess of 8.

4. The method defined in claim 1 wherein step (a) the proportions of the monoaluminumhydrophosphate and the boric acid are so selected that prior to exposure to fire, said fire-retardant mass is an optically clear layer.

5. A method of making a fire-retardant barrier comprising the steps of:

(a) reacting in the presence of water an amount from 90 to 95% by weight of monoaluminumhydrophosphate, from 4 to 8% by weight of boric acid, and from 1 to 2% by weight of aluminum hydroxide gel to produce a reaction product;

(b) adjusting the water content of said reaction product to yield a translucent fire-retardant mass having a viscosity within a range from flowable liquid through viscous to extrudable; and (c) disposing said fire-retardant mass between two glass panes to form said barrier.

6. The method defined in claim 5 wherein in step (a) the proportions of the monoaluminumhydrophosphate and the boric acid are so selected that, upon exposure to fire and in a fire-retardant reaction, said fire-retardant mass expands in volume by a factor of at least 6.

7. The method defined in claim 6 wherein said factor is in excess of 8.

8. The method defined in claim 7 wherein in step (a) the proportions of the monoaluminumhydrophosphate and the boric acid are so selected that prior to exposure to fire, said fire-retardant mass is an optically clear layer.

9. A fire-retardant mass as made by the method of claim 1.

10. A fire-retardant barrier, comprising a pair of spaced apart glass panes, and a translucent fire-retardant mass between said panes, said fire-retardant mass consisting essentially of a reaction product of the reaction of from 90 to 95% by weight of monoaluminumhydrophosphate, from 4 to 8% by weight of boric acid, and from 1 to 2% by weight of aluminum hydroxide gel.

* * * * *